(12) United States Patent
Boersma

(10) Patent No.: US 9,347,797 B2
(45) Date of Patent: May 24, 2016

(54) SHAPE MEMORY SENSOR

(75) Inventor: Arjen Boersma, 's-Hertogenbosch (NL)

(73) Assignee: NEDERLANDSE ORGANISATIE VOOR TOEGEPAST-NATUURWETENSCHAPPELIJK ONDERZOEK TNO, Delft (NL)

( * ) Notice: Subject to any disclaimer, the term of this patent is extended or adjusted under 35 U.S.C. 154(b) by 379 days.

(21) Appl. No.: 12/810,412

(22) PCT Filed: Dec. 24, 2008

(86) PCT No.: PCT/NL2008/050849
§ 371 (c)(1),
(2), (4) Date: Oct. 22, 2010

(87) PCT Pub. No.: WO2009/084954
PCT Pub. Date: Jul. 9, 2009

(65) Prior Publication Data
US 2011/0052116 A1    Mar. 3, 2011

(30) Foreign Application Priority Data

Dec. 28, 2007 (EP) .................................. 07150481

(51) Int. Cl.
| | | |
|---|---|---|
| *G02B 6/02* | (2006.01) | |
| *G01D 5/02* | (2006.01) | |
| *G01D 5/353* | (2006.01) | |
| *G01K 5/48* | (2006.01) | |

(52) U.S. Cl.
CPC .............. *G01D 5/02* (2013.01); *G01D 5/35303* (2013.01); *G01K 5/483* (2013.01); *G02B 6/02104* (2013.01)

(58) Field of Classification Search
CPC ......................... G02B 6/021; G02B 6/02104
See application file for complete search history.

(56) References Cited

U.S. PATENT DOCUMENTS

| | | | |
|---|---|---|---|
| 7,651,862 B2 * | 1/2010 | Ponce et al. ................... | 436/164 |
| 7,796,843 B2 * | 9/2010 | Song et al. ...................... | 385/12 |
| 2005/0105587 A1 | 5/2005 | Shahinpoor | |
| 2005/0105841 A1 | 5/2005 | Luo et al. | |
| 2007/0116402 A1 * | 5/2007 | Slade et al. ..................... | 385/12 |

FOREIGN PATENT DOCUMENTS

| | | |
|---|---|---|
| FR | 2650670 A | 2/1991 |
| FR | 2706606 A | 12/1994 |
| JP | 62069132 A | 3/1987 |
| WO | 00/28352 A | 5/2000 |
| WO | 02/097388 A | 12/2002 |
| WO | 2007/002161 A | 1/2007 |

* cited by examiner

*Primary Examiner* — John M Bedtelyon
(74) *Attorney, Agent, or Firm* — Lucas & Mercanti, LLP.

(57) ABSTRACT

The invention relates to a sensor for measuring an environmental effect, comprising a sensor material having an internal stress, which sensor material is designed to at least partially relax under the influence of the environmental effect. The sensor further comprising a detection unit for indirectly or directly detecting said relaxation. The invention also relates to a waveguide, comprising a grating in at least a portion of the waveguide, which waveguide comprises a coating, the coating comprising a polymer that contains reversible crosslinks that can be broken by the environmental effect in such a way that the polymer changes shape. The invention further relates to a sensor system comprising a waveguide, a light source, and a photo-detector.

18 Claims, 1 Drawing Sheet

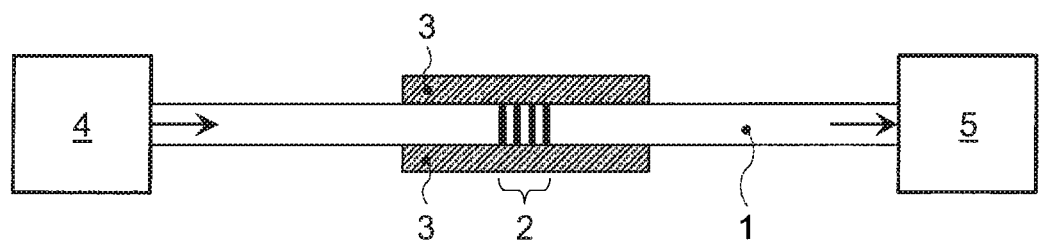

SHAPE MEMORY SENSOR

CROSS-REFERENCE TO RELATED APPLICATIONS

This application is a 371 of PCT/NL2008/050849 filed Dec. 24, 2008, which claims the benefit of European Patent Application No. 07150481.5 filed Dec. 28, 2007, the contents of each of which are incorporated herein by reference.

FIELD OF THE INVENTION

The invention relates to sensor material, to a sensor comprising a waveguide provided with the sensor material and to use of the sensor for measuring an environmental effect.

BACKGROUND OF THE INVENTION

The monitoring of gases and liquids has become increasingly important in diverse areas such as the processing industry, science, the medical sector, protection of the environment, the oil and gas industry and in general all places where safety needs to be guarded. Environmental effects that are measured concern the measurement of physical parameters and/or the detection of specific components in a gas or liquid. For many purposes it is desired that a sensor meets one or more of the following requirements: small, remotely operable, mobile, high sensitivity, low detection limit, high robustness, small response time, high selectivity, large dynamic range, high accuracy.

Examples of sensors that perform well with respect to one or more of these requirements are optical sensors and microelectromechanical system (MEMS) cantilever chemical sensors.

Advantages of optical sensors include their easy operation on large distances, their small size, their flexibility and/or the possibility to make a sensor system consisting of an array of discrete sensors that all may be read separately from a single optical fibre.

One specific advantage of optical sensors over electronic measuring systems is that optical sensors are usually not adversely affected by the electromagnetic radiation that is generally produced in for example power cable systems, induction furnaces or equipment for nuclear magnetic resonance measurements, such as MRI or NMR equipment.

Optical sensors usually comprise a waveguide to transport the data of the measurement in the form of a specific spectrum of light. One principle on which an optical sensor system may be based is an axial strain of the waveguide, as a result of an environmental effect that is to be detected, for example by using a coating on the waveguide that deforms under the influence of the environmental effect. When a waveguide grating, guiding a specific spectrum of light, stretches or shrinks under such axial strain, the spectral pattern of transmitted light and/or the spectral pattern of reflected light (i.e. the spectral response) changes. Such changes in the spectral response provide—when measured—quantitative information on the environmental effect.

Typical sensor systems that are based on waveguide grating are, e.g., described in detail in U.S. Pat. No. 5,380,995, U.S. Pat. No. 5,402,231, U.S. Pat. No. 5,592,965, U.S. Pat. No. 5,841,131, U.S. Pat. No. 6,144,026, US 2005/0105841, U.S. Pat. No. 7,038,190, US 2003/156287.

US application 2005/0105841 relates to the use of a polyethyleneimine (PEI) monolayer coating on a Long Period Grating waveguide. The coating swells under the uptake of water, which makes a sensor comprising such coating suitable for measuring relative humidity (RH), based on changes of the refractive index of the coating. However, changes in refractive index are not selective for the detection of water, which makes the sensor sensitive to environmental pollutions. The preparation of the sensor is cumbersome due to the slow deposition of the monolayer. Also, the response time is relatively long, especially at a high humidity, and it appears that very high humidities cannot be measured, which results in a small dynamic range of the sensor. The refractive index of the coating should be tuned to the specific waveguide grating and therefore cannot be generally used on other waveguides. Thus, the technology of refractive index sensors is mainly limited to Long Period Grating waveguides, and such waveguides cannot be used in long multiple sensor waveguides.

A thesis by J. L. Elster ("Long Period Grating-based pH sensors for corrosion monitoring, Blacksburg, Va., 1999") relates to a poly-acrylic acid coating on a Long Period Grating waveguide, which was applied to constitute a pH sensor. Such pH sensors are based on a change in refractive index of the coating around the cladding due to changes in the H+-concentration. Such sensors have disadvantages similar to those of the relative humidity sensor described US application 2005/0105841.

U.S. Pat. No. 7,038,190 relates to an optical humidity sensor making use of medical grade polyurethane foam or polyimide to sense humidity. Amongst others, the application describes to provide a fibre with an epoxy acrylate, that has a similar thermal response to polyimide but is relatively insensitive to humidity. Thus, in combination with polyimide it can be used as a fibre grating filter, to correct changes in signal of the grating coated with polyimide due to changes in temperature. Due to the thickness of the polymer layers, the response time is long (hours). No information is given concerning the preparation and the specific properties of the sensors.

Advantages of MEMS cantilever chemical sensors include their small size and/or their accuracy. A principle on which a MEMS cantilever chemical sensor may be based is a change in the properties of the cantilever element as a result of an environmental effect that is to be detected, for example by using a coating on the waveguide that changes the mass, stress, electrical or thermal properties of the cantilever element under the influence of the environmental effect. Such changes provide—when measured—quantitative information on the environmental effect.

Typical sensor systems that are based on a MEMS cantilever are, e.g., described in detail in *Journal of Colloid and Interface Science* 316 (2), pp. 687-693 and *Materials Today* 5 (1), pp. 22-29. The responsive layers on the cantilevers show a change in mechanical properties due to absorption of an analyte. However, a large amount of analyte molecules have to be absorbed before a change is noticed.

SUMMARY AND DESCRIPTION OF THE INVENTION

It is an object of the present invention to provide new sensor material that can serve as an alternative for known sensor material.

It is a further object to provide sensor material that is more sensitive to (a change in) an environmental effect than known sensor material as described in the above cites publications. Application of such sensor material, for example as a coating on a waveguide or on a MEMS cantilever, can then provide a sensor that has a higher sensitivity towards (a change in) a specific physical parameter or a specific analyte.

It is a further object of the present invention to provide new sensor material that is more selective to (a change in) an environmental effect than known sensor material as described in the above cites publications. Application of such sensor material, for example as a coating on a waveguide, can then provide a sensor that is more selective towards (a change in) a specific physical parameter or a specific analyte.

One or more other objects which may be met in accordance with the present invention will be apparent from the description below.

The selectivity of a detection system for measuring a certain environmental condition is the extent to which the detector specifically reacts to a change in a selected environmental conditions, without being affected by a change in other conditions.

The dynamic range of a sensor system is the range of a changeable quantity that can be measured with that sensor system, the limits of which range are defined by the smallest and the largest value of the changeable quantity that can be measured with that sensor system.

The accuracy of a detection system is the closeness of a reading or indication of that detection system to the actual value of the quantity being measured.

Robustness is the extent to which a detection system is resistant to changes in the detection system, influences from a specific sample and influences from the environment other than the condition, other than the changes in the condition to be measured. Accordingly, as a system is more stable, the back ground noise will be less and/or fewer artifacts will occur in the measuring signal, such a spikes, base line drift and/or base line shifts.

The detection limit is the lowest measurable change in a environmental condition. It is determined by the signal to noise ratio. In general, the detection limit for a particular substance is set at a signal to noise ratio of 2 (if the noise is represented as peak to peak) or 4 (if the noise is represented as the root of the mean square noise (RMS noise)). Sensitivity of a detection system is the extent to which the measured signal changes upon a particular change in the concentration or amount of the substance to be detected.

The sensitivity of a detection system is the smallest change in a environmental condition, such as a physical or chemical parameter, that can be detected by the detection system.

The response time of a detection system is the time that elapses between the exposure to a certain enviromental effect and the moment on which this exposure is completely translated into the sensor-output of the sensor.

BRIEF DESCRIPTION OF THE DRAWINGS

FIG. 1 shows a schematic drawing of the waveguide according to the invention.

It has now been found that one or more of these objects are realised by providing a sensor material having internal stress, that can be released under the influence of an environmental effect.

Accordingly, the present invention relates to a sensor for measuring an environmental effect, comprising sensor material having internal stress, which sensor material is designed to at least partially relax under the influence of the environmental effect, the sensor further comprising a detection unit for indirectly or directly detecting said relaxation.

For example, as illustrated in FIG. 1 the waveguide of the present invention wherein:
1. is the waveguide
2. is the grating
3. is the coating comprising the polymeric sensor material
4. is a light source
5. is an optical detector.

The arrow showing the direction of the light emitted from the light source.

In particular, the invention relates to a sensor for measuring an environmental effect, comprising a waveguide having a grating and a coating comprising a sensor material, the sensor material comprising a polymer, the sensor material having internal stress, which sensor material is capable of at least partially relaxing under the influence of the environmental effect, the sensor further comprising a detection unit for indirectly or directly detecting said relaxation.

A sensor system according to the invention may in particular be used for the detection of an analyte, more in particular for detecting at least one analyte selected from the group of water, carbon monoxide, oxygen, carbon dioxide, hydrogen cyanide, hydrogen sulfide, ammonia, $H_2S$, metal ions, metal-containing ions, biomolecules (e.g. DNA, RNA, a peptide, an enzyme), H+, and hydroxyl ions.

Further, a sensor system according to the invention may be used to measure (a change in) a physical parameter, such as a change in temperature, pressure, voltage or light intensity.

A sensor material according to the invention preferably comprises a polymer, which is a substance of which the molecules, in particular organic molecules, are built up from at least two monomeric units, usually at least 10 monomeric units, preferably at least 50 monomeric units, at least 100 monomeric units, or at least 250 monomeric units. The upper limit is not particularly critical and can be, for instance, 1 000, 10 000, 100 000, 1 000 000, or more than a 1 000 000 monomeric units. The monomeric units may be the same (a homopolymer) or the polymer may be composed of two or more different monomers (a copolymer).

In an embodiment, the polymer comprises an aliphatic chain of monomeric units, which monomeric units may be of one or more different types. The type of monomeric units depend on the environment where the sensor is to be operated. Examples of polymers with an aliphatic chain for use in water or humid environments are polymers composed of at least one monomer selected from the group of acryloylmorpholine, acrylic acid, acrylamide, vinyl alcohol, vinylacetate and vinyl pyrrolidone. Examples of polymers with an aliphatic chain for use in apolar environments are polymers composed of at least one monomer selected from the group of ethylene, propylene, butylene, butadiene, styrene, vinylchloride and alkyl (meth)acrylate.

In another embodiment, the polymer comprises aromatic or heterocyclic monomeric units. These polymers can be used in more extreme environments, such as high temperature and/or pressure.

For the purpose of the invention, with an aliphatic chain is meant a chain that is free of an aromatic moiety in the chain. Typically, an aliphatic chain comprises single bonds, which contribute to the flexibility of the material.

The polymer may comprise side-chains, which are chains that are substantially shorter than the main chain on which they reside. Side-chains optionally comprise functional groups and/or heteroatoms. Such functional groups and/or heteroatoms may serve as anchoring points for crosslinks.

A sensor according to the invention is in general based on the use of a so-called shape-memory effect. Sensors making use of such principle may comprise a material that is under an internal mechanical stress (in which state the material may be referred to as a 'deformed shape' or 'deformed state'), and are designed to at least partially relax under the influence of an environmental effect (in which state the material may be referred to as its 'memory shape' or 'memory state'). Thus, the material changes shape from a deformed shape to a memory shape, in response to exposure to a specific environmental condition. The relaxation of the material can thus be noticed by observing the change in shape can be registered. The present invention allows detection of minute changes in the relaxation of the material, that are not visible to the naked eye. The principle of memory shape materials per se is generally known in the art. For example shape memory alloys have numerous application in medical and industrial applications. They may e.g. be designed to relax from a deformed state into a memory state, upon exposure to heat. The relaxation process may be the result of a thermally-induced crystalline phase transformation.

In WO 2007/002161, the use of a shape memory polymer is proposed as an indicator for the expiry of a product (due to exposure to too high a temperature or too much moisture). The mechanism underlying the functioning of the material of WO 2007/002161 is of a physical nature. The transition process from a deformed state to a memory state is a thermo-molecular relaxation, as a result of an increase in temperature above the glass transition temperature of the polymer ($T_g$) or as a result of a reduction in the Tg under the influence of the environment.

In principle, a sensor according to the invention may comprise a coating making use of a physical mechanism, such as a thermally-induced crystalline phase transformation mechanism or a thermo-molecular relaxation mechanism. In a preferred embodiment, the mechanism whereby the sensor material in a sensor of the present invention relaxes upon exposure to an environmental effect is of a chemical nature, namely the sensor material preferably comprises chemical bonds that break upon exposure to the environmental effect.

A polymeric sensor material according to the invention preferably comprises crosslinks, that are capable of breaking under the action of a (a change in) a specific physical parameter or under the action of a specific analyte. As a result of this breaking, the internal stress of the sensor material can be released. The principle of chemical bonds, such as crosslinks that are broken under the influence of an environmental effect is known in the art. For example, chemical bonds (including crosslinks) are known that are not stable upon a temperature increase (thermo-labile bonds), to an acid (acid labile bonds), or to water (e.g. hydrolysable ester bonds). Chemical bonds, that are cleavable by exposure to a specific environmental condition, such as increased temperature or a specific chemical substance, are generally referred to as 'labile bonds' (labile crosslinks, in the case the bond is a crosslink).

In an embodiment, at least part of the crosslinks comprise functional groups that are capable of associating with an ion, in particular a multivalent metal ion or an ionic compound containing a multivalent metal ion.

In particular, such crosslinks comprise multivalent metal ions that connect two or more negatively charged groups that are present on a side-chain or on a main chain. Examples of multivalent metal ions are multivalent transition metal ions, e.g. zinc, iron, chromium, nickel and copper, and an alkaline earth metal ions, e.g. barium, calcium or magnesium. Examples of functional groups that can form a crosslink together with a multivalent metal ion are carboxylates, alkoxylates, phosphonates, and sulfonates. Such crosslinks can break under the influence of acid, of base or of a molecular entity that has a stronger association constant with the metal ion than the negatively charged groups in the polymer. Accordingly, a polymer comprising such crosslinks is particularly suitable for a sensor that can be used to measure such acid, base or molecular entity. In Scheme 1, an example is given where crosslinks comprise carboxylate groups and a $Zn^{2+}$-ion.

Scheme 1.

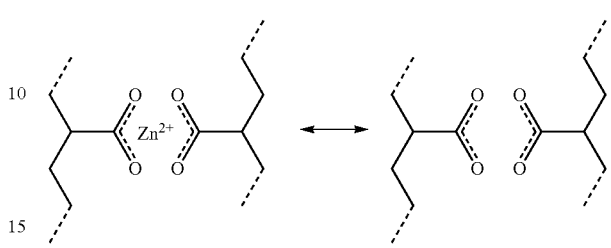

In an embodiment, at least part of the crosslinks comprise ester or amide functional groups. The hydrolysis of these groups results in breaking of the crosslinks, which can be catalysed by acid or base. Such hydrolysis can also be catalysed by more specific catalysts, such as enzymes. Accordingly, a polymer comprising such crosslinks is particularly suitable for a sensor that can be used to measure such acid, base or enzyme. In Scheme 2, an example is given where crosslinks comprise an ester or an amide group.

Scheme 2.

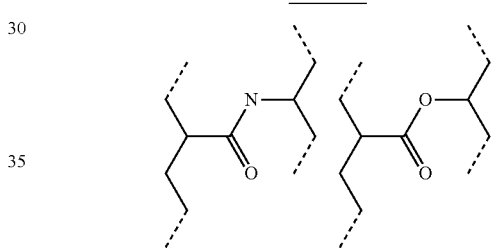

In an embodiment, at least part of the crosslinks comprise Diels-Alder adducts. The reverse Diels-Alder reaction of such adducts results in breaking of the crosslinks, thereby forming an entity comprising a diene moiety and an entity comprising an ethylene moiety. The reverse Diels-Alder reaction takes place at elevated temperatures. Accordingly, a polymer comprising such crosslinks is particularly suitable for a sensor that can be used to detect a change in temperature. In Scheme 3, an example is given where crosslinks comprise the Diels-Alder adduct of furan and maleimide.

Scheme 3.

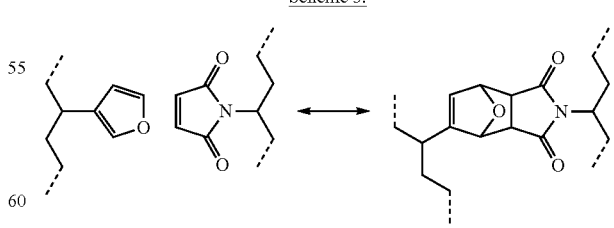

In an embodiment, at least part of the crosslinks comprise anomeric bonds. With an 'anomeric bond' is meant the C—O bond that connects two saccharide units, wherein the C is the hemiacetal carbon of one of the saccharide units and wherein the O is bridging between the two saccharide units. The hydrolysis of an anomeric bond—resulting in breaking of the crosslink—can be catalysed by an enzyme. Accordingly, a polymer comprising such crosslinks is particularly suitable for a sensor that can be used to detect an enzyme that is selective for the hydrolysis of a certain anomeric bond. In Scheme 4, an example is given where crosslinks comprise an anomeric bond.

Scheme 4.

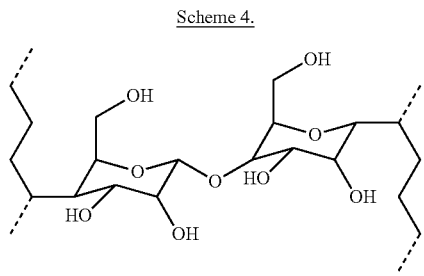

In an embodiment the polymer has been crosslinked with a diazido compound. A polymer comprising such crosslinks is particularly suitable for a sensor that can be used to detect UV-light. The diazido compound may in particular be represented by the formula $N_3$—Ar—CH=CH—Ar—$N_3$, wherein Ar represents an aromatic group, in particular a six-membered aromatic ring which optionally comprises one or more substituents. In particular, the diazido compound may be a diazidostilbene linker (DAS) or a diazido-derivative thereof, e.g. as described U.S. Pat. No. 5,041,570.

In an embodiment the polymer has been crosslinked with a peroxide linker, e.g. hydrogen peroxide or a peroxydisulfate. A polymer crosslinked with a peroxide linker is particularly suitable for a sensor that can be used to detect a change in temperature.

In another embodiment the polymer contains side chains that can crystallize and form physical crosslinks. These physical crosslinks can be broken or softened by a thermal treatment or the presence of a solvent or swelling agent for these side chains. Examples are given in e.g. *Polymers for Advanced Technologies* 5 (9), pp. 615-617

Suitable crosslinking conditions can be based on methods known per se and the information disclosed herein.

It is possible to prepare a crosslinked polymer by polymerising a monomer mixture comprising at least one monomer for forming the polymer backbone and at least one multifunctional monomer for forming the crosslinks. The concentration of multifunctional monomer, may for instance by chosen in the range of 1 to 30 w % of based on total monomers.

The crosslinking degree may be 1 to 50 crosslinks per 100 monomer units. The polymeric chains may be crosslinked reacting the polymer with a crosslinker, for example 1 to 30 w % of crosslinker, based on the total weight of the polymer.

The present invention further relates to a sensor system comprising a waveguide having a coating comprising sensor material that is designed to at least partially relax under the influence of the environmental effect, the sensor system further comprising a light source and a photo-detector, capable of determining the intensity of the light reaching the detector as a function of the wavelength.

For the purpose of the invention, the term waveguide is used for optical waveguides. An optical waveguide is a physical structure that guides electromagnetic waves in at least part of the optical spectrum, i.e. in at least part of the spectrum formed by the infrared, visible and ultraviolet ranges of the electromagnetic spectrum. In general, a waveguide is of elongate form. Common types of optical waveguides include optical fibres, e.g. as referred to in the above cited prior art, and rectangular waveguides. Waveguides are commercially obtainable from various sources. Manufacturing and applications can be found in the Encyclopedia of Laser Physics and Technology (http://www.rp-photonics.com/encyclopedia.html). Fibre Bragg Gratings are supplied by FOS&S, Geel, Belgium.

For the purpose of the invention, hereinafter with "grating" is meant a periodic variation of the refractive index of waveguide material in a segment of a waveguide core. A grating reflects particular wavelengths of electromagnetic waves and transmits other wavelengths, and can be used as an inline optical filter or as a wavelength-specific reflector.

A waveguide according to the invention may in particular comprise a 'Fibre Bragg Grating' (FBG) or a 'Long Period Grating' (LPG).

In a specific embodiment, a waveguide according to the invention comprises a multitude of gratings, which are typically spatially apart, preferably 2-500, in particular 2-100 gratings. In particular for a fibre Bragg grating, it is useful to have a multitude of gratings. This allows each grating on the waveguide to be designed in such a way that it creates a spectral response that is unique with respect to the other gratings on the waveguide. This allows, for instance, a single waveguide to be used to measure an environmental effect at a multitude of places. From a change in a specific unique spectral response (measured at one or both of the ends of a waveguide) it will be clear in the vicinity of which grating an environmental effect has changed. In particular in case different gratings are coated with different polymeric materials, adapted to respond towards a change in different environmental effect, this also allows the use of a single waveguide to measure a multitude of environmental effects.

The present invention further relates to an object comprising a waveguide according to the invention, in particular an object selected from the group of infrastructural elements, such as dikes, dams, tunnels, aquaducts, bridges, roads; landfills, subterranean water, oil or gas reservoirs, high voltage power cables, induction furnaces, equipment for nuclear magnetic resonance measurements, such as MRI or NMR equipment, and equipment for (chemical) processing industry, such as reactors, pipelines, separation devices, storage containers, and the like.

A coating layer of sensor material on a waveguide according to the invention usually has a thickness of at least 0.1 μm, preferably of 1 μm, more preferably of at least 10 μm. Usually, the thickness is 200 μm or less, in particular, at most 100 μm, preferably 75 μm or less, more preferably 50 μm or less. A relatively thin layer is advantageous for a short response time, a relatively thick layer is advantageous for a high sensitivity.

The invention further relates to a method for preparing a waveguide having a coating layer of sensor material according to the invention. In an advantageous method of the invention, the waveguide or at least a part thereof to be coated is placed in a mould, leaving a space between the outer surface of the waveguide or part thereof inside the mould and the inner surface of the mould, introducing the coating composition into the space; and curing the coating composition.

In a highly preferred method, the mould is transmittant for radiation used for initiating the polymerization and/or crosslinking. In particular, the mould may be transparent to light of a wavelength suitable to activate the polymerisation (usually UV-light or light in the visible range), and wherein the coating composition is cured inside the mould using light to activate the polymerization. Usually, in such case the composition used for preparing the coating comprises a photo-initiator. The light used is selected such that it is capable of activating the initiator. Suitable photo-initiators and suitable wavelengths for activation are generally known in the art.

Examples of suitable free-radical photoinitiators include benzoin derivatives, methylolbenzoin and 4-benzoyl-1,3-dioxolane derivatives, benzilketals, α,α-dialkoxyacetophenones, α-hydroxy alkylphenones, α-aminoalkylphenones, acylphosphine oxides, bisacylphosphine oxides, acylphosphine sulphides, halogenated acetophenone derivatives, and the like. Other examples of suitable initiators include benzophenone, hydroxymethylphenylpropanone, dimethoxyphenylacetophenone, 2-methyl-1-[4-(methylthio)-phenyl]-2-morpholino-propan-l-one, 1-(4-isopropylphenyl)-2-hydroxy-2-methylpropan-l-one, 1-(4-dodecyl-phenyl)-2-hydroxy-2-methylpropan-1-one, diethoxyphenyl acetophenone, and the like. Phosphine oxide photoinitator types (e. g., Darocur TPO by Ciba) such as benzoyl diaryl phosphine oxide photoinitiators may be used.

The internal stress in the polymer can be induced during or after the preparation of the polymer. For example, this can be performed by foaming the polymer, by swelling it in a softening agent followed by evaporation of the softening agent.

In an embodiment the internal stress in the polymer can be induced by foaming of the polymer. A foaming agent is incorporated in the sensor layer. After solidification of the layer, the layer is heated which causes the foaming agent to evaporate and form a foamed layer having an internal stress that can relax upon scission of the crosslinks. Examples are given in e.g. *Journal of Cellular Plastics* 42 (5), pp. 393-404 and *Mechanics of Composite Materials* 41 (3), pp. 277-290.

In another embodiment the internal stress in the polymer can be induced by swelling of the polymer. The polymer sensor layer is applied and crosslinked. Subsequently, the sensor layer is swollen in a solvent, e.g. water or hydrocarbons. During swelling, the internal stress in the sensor layer is build up, but the deformation of the sensor layer is small. Upon exposure of the sensor to the analyte to be detected, the crosslinks are broken and the stressed polymer will absorb more solvents and expand. Examples are given in e.g. *Polymer* 41 (8), pp. 2893-2898.

In another embodiment the internal stress in the polymer can be induced during the curing of the polymer. During thermal or UV curing of the polymer sensor layer, internal stresses are generated due to shrinkage of the monomeric units when the polymer is formed. Examples are given in e.g. *Dental Materials* 21 (1), pp. 36-42 and *Composites Part A: Applied Science and Manufacturing* 37 (4), pp. 652-661.

It is possible to coat a selected part of the waveguide. Such part is not limited to an extremity of the waveguide. One or more parts remote from the extremities can be selectively coated.

The present invention further relates to a MEMS cantilever chemical sensor. A cantilever element in a MEMS may be provided with a coating of polymer according to the invention. The changed physical properties of the polymer as a result of the breaking of the crosslinks can be measured in the MEMS. Such changes are for example a change in resonance frequency of the cantilever element or a change in stress in the cantilever element.

The invention claimed is:

1. A sensor for measuring an environmental effect, comprising a waveguide having a core, the core having a grating in a segment of the core,
the waveguide further having a coating comprising a polymeric sensor material,
the polymeric sensor material having internal mechanical stress as a consequence of being in a deformed shape, which sensor material is configured to at least partially relax under the influence of the environmental effect by which relaxation the material changes shape from the deformed shape to a memory shape,
the sensor further comprising a detection unit for indirectly or directly detecting said relaxation,
wherein the grating is a fiber bragg grating.

2. A sensor according to claim 1, wherein the polymer comprises crosslinks, which crosslinks are adapted to be cleaved under the influence of the environmental effect.

3. A sensor according to claim 2, wherein the polymer comprises crosslinks selected from the group of amide group crosslinks, ester group crosslinks, complexed metal ion crosslinks, saccharide-based crosslinks, Diels-Alder-based crosslinks, diazidostilbene-based crosslinks and diperoxide-based crosslinks.

4. A sensor according to claim 1, wherein the detection unit is arranged to detect a change in the refractive index of the sensor material.

5. A sensor according to claim 1, wherein the detection system comprises a light source for sending light into the waveguide and a photo-detector for detecting light leaving the waveguide.

6. The sensor according to claim 1, wherein the coating has a thickness in the range of 0.1 to 200 μm.

7. The sensor according to claim 1, wherein the environmental effect is an analyte.

8. The sensor according to claim 7, wherein the analyte is selected from the group consisting of water, carbon monoxide, oxygen, carbon dioxide, hydrogen cyanide, ammonia, metal ions, metal-containing ions, biomolecules, DNA, RNA, a peptide, an enzyme, $H^+$, and hydroxyl ions.

9. The waveguide according to claim 7, wherein the grating is present in the core regardless of the presence of the analyte.

10. The waveguide according to claim 1, wherein the grating is present in the core when the material is under internal mechanical stress and when the sensor material is at least partially relaxed.

11. A waveguide comprising a core, the core having a grating in a segment of the core, the waveguide further having a coating, the coating comprising a polymeric sensor material, the polymeric sensor material having internal stress as a consequence of being in a deformed shape, and wherein the polymeric sensor material is configured to at least partially relax under the influence of the environmental effect by which relaxation the material changes shape from the deformed shape to a memory shape, the sensor further comprising a detection unit for indirectly or directly detecting said relaxation, the waveguide comprising a fiber bragg grating.

12. The waveguide according to claim 11, wherein the coating has a thickness in the range of 0.1 to 200 urn.

13. The waveguide according to claim 11, wherein the environmental effect is an analyte.

14. The waveguide according to claim 13, wherein the analyte is selected from the group consisting of water, carbon monoxide, oxygen, carbon dioxide, hydrogen cyanide, ammonia, metal ions, metal-containing ions, biomolecules. DNA, RNA, a peptide, an enzyme, $H^+$, and hydroxyl ions.

15. The waveguide according to claim 13, wherein the grating is present in the core regardless of the presence of the analyte.

16. The waveguide according to claim 11, wherein the polymer comprises crosslinks, which crosslinks are adapted to be cleaved under the influence of the environmental effect.

17. The waveguide according to claim 11, wherein the polymer comprises crosslinks selected from the group consisting of amide group crosslinks, ester group crosslinks, complexed metal ion crosslinks, saccharide-based crosslinks, Diels-Alder-based crosslinks, diazidostilbene-based crosslinks and diperoxide-based crosslinks.

18. The waveguide according to claim 11, wherein the grating is present in the core when the material is under internal mechanical stress and when the sensor material is at least partially relaxed.

* * * * *